May 4, 1926.
H. J. SWARTS
1,583,626
IDENTIFICATION TAG
Filed Feb. 2, 1925
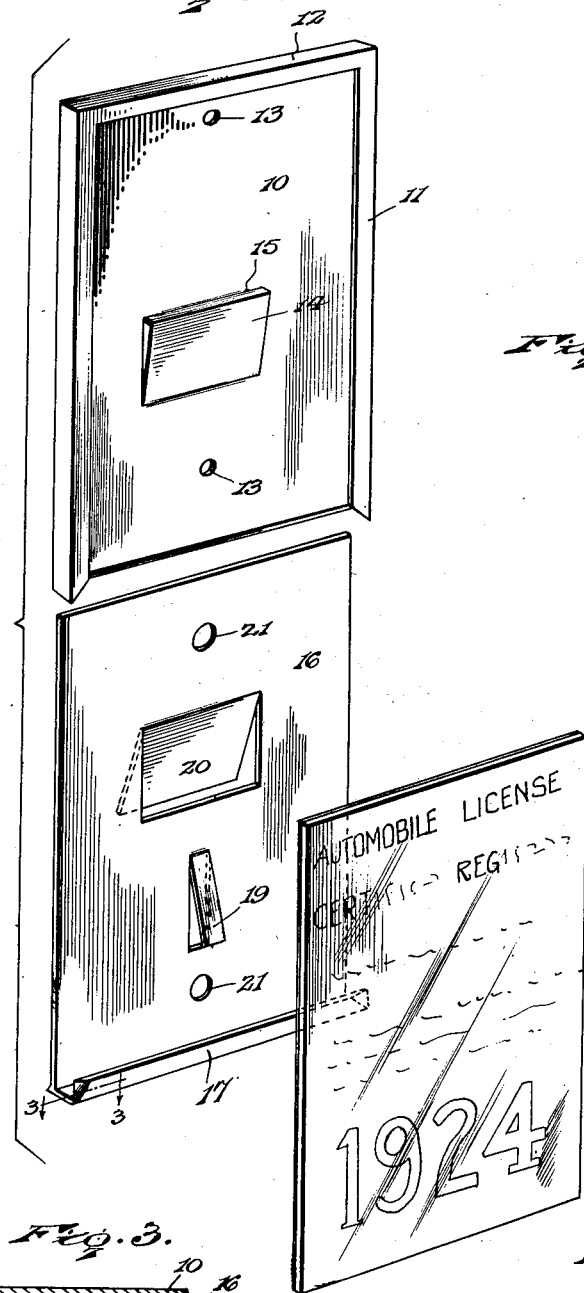
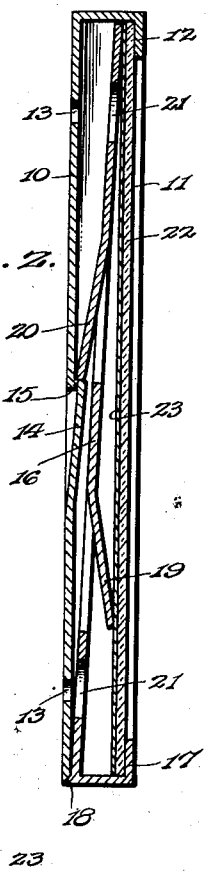
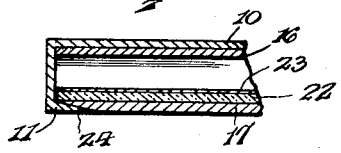
Inventor
H. J. Swarts.
By Lacy & Lacy, Attorneys Patented May 4, 1926.

1,583,626

UNITED STATES PATENT OFFICE.

HARRY J. SWARTS, OF TULSA, OKLAHOMA, ASSIGNOR TO DE FOREEST CORPORATION, OF TULSA, OKLAHOMA, A TRUST ASSOCIATION OF OKLAHOMA.

IDENTIFICATION TAG.

Application filed February 2, 1925. Serial No. 6,354.

*To all whom it may concern:*

Be it known that I, HARRY J. SWARTS, a citizen of the United States, residing at Tulsa, in the county of Tulsa and State of Oklahoma, have invented certain new and useful Improvements in Identification Tags, of which the following is a specification.

This invention relates to an improved identification tag of the general character shown in Patent No. 1,260,156, granted March 19, 1918, to E. J. W. De Foreest, as well as Patent No. 1,502,137, granted July 22, 1924, to E. J. W. De Foreest, et al, and seeks to provide a device of simplified construction which may be permanently applied to a motor vehicle or the like for identifying the vehicle.

The invention seeks, as a further object, to provide a device which, while being capable of ready application, cannot, nevertheless, be removed without mutilation, so that the genuineness of the license certificate contained by the device may be determined by whether or not the device has been so mutilated.

And the invention seeks, as a still further object, to provide a device the major parts of which may be readily stamped from suitable sheet metal.

Other and incidental objects will appear hereinafter.

In the accompanying drawings:

Figure 1 is a perspective view particularly showing the mating plates of the device.

Figure 2 is a vertical sectional view taken medially through the device.

Figure 3 is a detail sectional view on the line 3—3 of Figure 1, looking in the direction indicated by the arrows.

In carrying the invention into effect, I employ an oblong back plate 10 which may be formed of suitable resilient sheet metal and is provided with channel-shaped side flanges 11 connected at one end of the plate by a similarly shaped end flange 12. The plate is provided near its ends with medial openings 13 to receive screws or other suitable fastening devices securing the plate to a vehicle or the like, and pressed inwardly from the plate substantially midway between its ends is a wedge-shaped locking member 14, the upper edge of which forms a shoulder 15 extending transversely of the plate. Shaped to slidably fit between the flanges 11 of the plate 10 is a locking plate 16 provided at its outer end with a channel-shaped flange 17 to mate with the flanges 11 of the back plate, as well as with a transverse bead or shoulder 18 to mate with the adjacent end edge of said back plate. The plate 16 is also preferably formed of suitable resilient sheet metal and struck forwardly therefrom is a spring tongue 19. Struck rearwardly from the plate above the tongue 19 is a considerably wider spring locking tongue 20 to coact with the locking member 14 of the plate 10, and formed in the plate 16 near its ends are openings 21 adapted to register with the openings 13. As shown in Figure 2, the openings 21 are considerably larger than the openings 13 so as to permit of removal of screws or like fastening devices from the latter openings.

In conjunction with the plates 10 and 16, I provide a front pane 22 which may be of glass and is shaped to fit between the flanges 11 of the former plate. A conventional license certificate is indicated at 23. In use, the plate 10 is first secured to the vehicle in the manner previously indicated, when the certificate 23 is positioned at the inner side of the pane 22 to lie flat thereagainst. The plate 16 is then arranged to overlie the certificate and the flange 17 engaged with the lower end of the pane, when said plate and the pane are slid between the flanges 11 of the plate 10. The certificate may be pasted to the pane or, if preferred, may be folded over the inner end of the plate 16. Thus, the free end of the tongue 20 will be caused to ride upwardly over the locking member 14 until, when the plate 16 reaches the limit of its inward movement and the free end of the tongue clears said locking member, as shown in Figure 2, the tongue will snap outwardly against the bottom of the back plate to coact with the shoulder 15 of the locking member. The plate 16 will thus be securely locked against removal so that the pane 22 and license certificate 23 cannot be displaced except by mutilation of the plates 10 and 16 or by the fracture of the pane.

Attention is now directed to the fact that when the plates 10 and 16 are assembled, as shown in Figure 2, the locking tongue 20 will coact with the bottom of the back plate for pressing the upper end of the plate 16 forwardly against the license certificate 23 while the spring tongue 19 is disposed to bear directly against the license certificate for pressing the lower end of the pane forwardly. The pane will thus be tightly held against the flanges 11, 12 and 17 of the plates for excluding dust as well as moisture while the license certificate will be held flat against the inner side of the pane. Preferably, the overlapping ends of the flanges 11 and 17 are, as particularly shown in Figure 3, beveled, as indicated at 24, so as to provide lap joints between the flanges.

Having thus described the invention, what I claim is:

1. A device of the character described including companion slidably assembled plates having mating flanges, a front pane encircled by said flanges, and means locking the plates against separation and tilting one of the plates with respect to the other for pressing the pane toward said flanges.

2. A device of the character described including companion slidably assembled plates having mating flanges, a front pane encircled by said flanges, means locking the plates against separation and tilting one of said plates with respect to the other for pressing one end portion of the pane toward said flanges, and means carried by said plate to cooperate with the pane for pressing the opposite end portion of the pane toward said flanges.

3. A device of the character described including companion slidably assembled plates having mating flanges, a front pane encircled by said flanges, a locking member carried by one of the plates and inclining longitudinally thereof between the plates, said member terminating in a shoulder, and a spring tongue carried by the other of said plates to ride over said member and normally engaging behind the shoulder for locking the plates against separation, said tongue acting to tilt the latter plate with respect to the former plate for pressing the pane forwardly.

4. A device of the character described including companion slidably assembled plates having mating flanges, a front pane encircled by said flanges, a shoulder carried by one of the plates, and a spring tongue carried by the other of said plates to engage behind said shoulder for locking the plates against separation and acting to tilt the latter plate with respect to the former plate for pressing the pane toward said flanges.

5. A device of the character described including companion slidably assembled plates having mating flanges, a front pane encircled by said flanges, a shoulder pressed forwardly from the bottom of one of said plates, a spring tongue pressed rearwardly from the other of said plates to engage behind said shoulder for locking the plates against separation, and a second spring tongue pressed forwardly from the latter plate to cooperate with the pane, the tongues cooperating for pressing the pane toward said flanges.

In testimony whereof, I affix my signature.

HARRY J. SWARTS. [L. S.]